Dec. 12, 1950     J. BODNAR     2,533,421
ROTATABLE STEAM JOINT
Filed Jan. 21, 1949
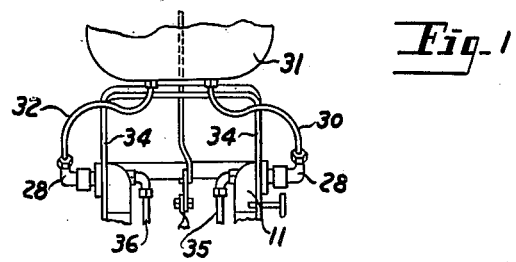
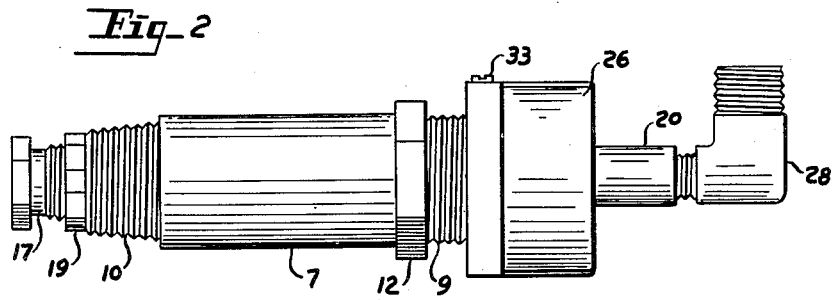
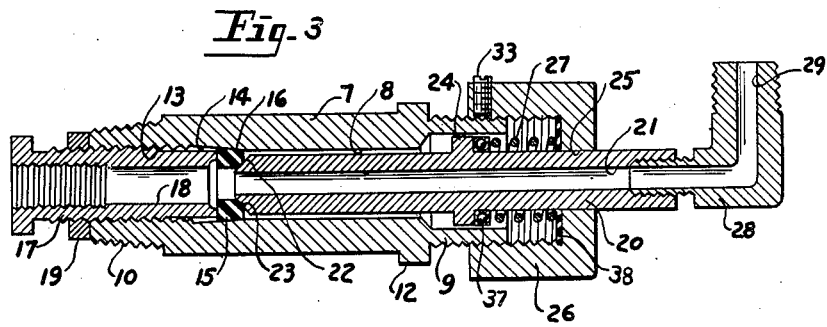
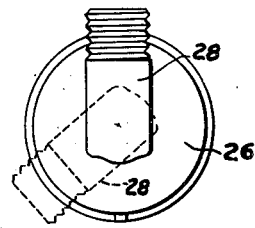
INVENTOR.
JOSEPH BODNAR.
BY
ATTORNEY.

Patented Dec. 12, 1950

2,533,421

UNITED STATES PATENT OFFICE 2,533,421

ROTATABLE STEAM JOINT

Joseph Bodnar, Detroit, Mich., assignor to William Sutherland and George DiPaola, both of Detroit, Mich.

Application January 21, 1949, Serial No. 71,849

7 Claims. (Cl. 285—97.6)

My invention relates to a new and useful improvement in a rotatable steam joint, and from the description given it will be obvious that it may be used for various types of fluid under pressure such as air and gas as well as steam and liquid. In some applications it is necessary in a joint in which fluid is delivered under pressure that the portion of the joint be rotatable. A common practice under such conditions is to resort to packing, so as to pack around the rotatable part sufficiently tight to prevent escape of the fluid under pressure. In such joints, however, the packing becomes worn and constant annoyance is encountered because of leaks, so that the repacking of a tightening of the packing must be periodically resorted to, and eventually the packing must be removed and replaced with new packing.

It is an object of the present invention to provide a joint of this class so constructed and arranged that packing is unnecessary around the rotatable part of the joint.

Another object of the invention is the provision in a joint of this type of a rotatable conduit so arranged and constructed that it engages at its end with a seat which forms a leakproof connection.

Another object of the invention is the provision in a joint of this class of a rotatable conduit engaging at its end a seat and held in sealing engagement with the seat by a suitable spring.

Another object of the invention is the provision in a joint of this type of a construction whereby a removable seat may be easily and quickly placed in position for engaging the end of a rotatable conduit.

Other objects will appear hereinafter.

It is recognized that various modifications and changes may be made in the detail of structure illustrated, but it is intended that the illustration herein is but one practical embodiment of the invention.

Forming a part of the specification are drawings in which:

Fig. 1 is an elevational view of the invention applied;

Fig. 2 is a side elevational view of the invention;

Fig. 3 is a longitudinal, central, vertical, sectional view of the invention;

Fig. 4 is an end elevational view of the invention.

As shown in the drawings, I provide a housing 7 which serves as an axle or shaft upon which a rotatable part may be mounted. This housing 7 has a bore 8 formed therein and is provided at one end with the externally threaded portion 9 and at the opposite end with the externally threaded portion 10. A common practice is to mount the body 7 in a suitable support 11 with the flange 12 engaging against one side so that a nut threaded on the portion 10 will clamp the flange 12 against the supporting body 11. One end of the body 7 is internally threaded as at 13, and this internally threaded portion communicates with a tapered bore 14 communicating with the bore 8. Positioned in this tapered portion 14 is a seat-forming body 15, which is annular with an opening formed therethrough and which is tapered on its periphery as at 16 to correspond with the taper 14. In assembly, the washer 15 is dropped into the end of the body 7 so that it engages in the taper 14. The sleeve 17 is then threaded into the threaded portion 13 to engage the seat-forming washer 15 and force it further into the tapered portion so that the member 15 thus becomes securely wedged in the tapered portion, the tapered portion 14 at its smallest end being smaller than the diameter of the seat-forming washer 15. When this has been accomplished, the lock nut 19, which is threaded on the sleeve 17, is then tightened against the end of the threaded portion 10. Extending through the sleeve 17 is a bore 18 which is internally threaded at one end.

Projected into the opposite end of the body 7 is a tube 20 having the passage 21 formed therethrough and provided on its inner end with the face 22, which is formed of a spherical contour to engage the recess 23 formed in the face of the seat-forming washer 15. This recess 23 is of spherical contour also to closely fit against the face 22. A peripheral flange 24 is formed on the tube intermediate its ends, this tube 20 projecting through an opening 25 formed in the cup-shaped nut 26 which is threadable upon the portion 9. Embracing the tube 20 and positioned within the cup-shaped nut 26 is a coil spring 27, one end of which bears against the flange 24 and the other end of which bears against the bottom of the cup-shaped nut 26. The construction is such that as the nut 26 is threaded on to the portion 9, the tube 20 is pressed inwardly so that the face 22 is tightly pressed against the face 23 by means of the pressure of the spring 27. When the proper pressure is attained, the nut 26 is locked against unturning by means of the set screw 33. Threaded into the end of the tube 20 is a fitting 28 having the passage 29 formed therethrough.

In Fig. 1 I have illustrated an application of the invention used as a steam joint on a garment presser machine having the head 31, leading into which are the tubes 30 and 32, one of these tubes being an inlet delivery tube and the other being an outlet delivery tube. The tube 30 would be threaded on to the fitting 28, as would likewise the end of the tube 32. This head 31 is mounted upon a suitable rockable support 34 so that as the head is rocked downwardly or upwardly, the member 28 will also be rocked upwardly or downwardly, the tubes 30 and 32 being rigid. In Fig. 4 I have shown the member 28 rocked from full line position to dotted line position. As this rocking movement is effected, the tube 20 also rocks, but it rocks with its face 22 in engagement with a corresponding face 23 formed in the seat-forming washer 15, so that there is always maintained a tight connection. As the rocking continues, the pressure of the end of the tube 20 will further seat snugly against the face 23. Experience has shown that a very durable and leakproof construction may be obtained when the seat-forming washer 15 is formed from vulcanized fiber. This fiber has the property of resisting wear and also resisting deterioration from the steam which is passing through the tubes. Connected to the outer end of the sleeve 17 would be an inlet delivery pipe 35 or an outlet delivery pipe 36, so that the steam may be delivered through the joint into the interior of the head 31 and thence outwardly through the outlet pipe or tube through the other joint. Experience has shown that a joint constructed in this manner is leakproof and durable, requiring no attention such as packing and the like. While I have illustrated the invention used with a machine requiring a steam joint, it is believed obvious that the joint may be used also with other types of fluid delivery conduits.

In order to facilitate rotation of the tube 20, I provide a thrust bearing 37 against which one end of the spring 27 engages, the other end engaging the gasket 38, so that the spring 27 remains stationary while the tube 20 rotates.

What I claim is:

1. A joint of the class described, comprising a tubular body having a tapered bore formed adjacent one end and communicating with a bore continuing the tapered bore and of substantially the same inside diameter as the small end of the tapered bore; a seat-forming washer positioned in said tapered portion; a thrust delivery member inserted into said body for delivering a thrust against said washer and forcing the same into the tapered portion; a conduit inserted from the opposite end of said body and engaging at one end with said washer, the engaging end of said conduit having a seat formed thereon, said washer having a recess formed in its face engageable with the seat on said conduit; a spring for normally maintaining said end of said conduit in engagement with said washer; and a nut for engaging said spring and retaining the same in position, said nut being threaded on one end of said body.

2. A joint of the class described, comprising: a tubular body having a bore formed therethrough, said bore being internally threaded adjacent one end and having a tapered portion adjacent the inner end of the threaded portion, said tapered portion, at its smaller end, being of the same diameter as the remaining portion of said bore; a seat-forming washer positioned in said tapered portion; a presser member threaded into the threaded portion of said bore and engaging at one end against said washer for forcing the same into the tapered portion, said presser member being tubular; a tube projected inwardly of said bore from the opposite end of said body and having its inner face formed of spherical contour, said washer having on its opposed face a recess formed of spherical contour for engaging the inner face of said tube to provide a leakproof connection; a spring pressing against said tube for maintaining said face in engagement with the face of said seat-forming washer; and a nut threaded on said body for engaging said spring and adapted upon threading on to or off of said body for adjusting the tension of said spring.

3. A joint of the class described, comprising a body having a bore formed therethrough, said bore at one end of said body being internally threaded and provided with a tapered portion adjacent the threaded portion; a seat-forming washer positioned in said body and engageable in said threaded portion; a presser member threaded into said body for pressing against said washer and lodging the same in said tapered portion, said body at its opposite end having an externally threaded portion; a tube inserted into said body, said tube having a face of substantially spherical contour formed on its end and engageable with a recess formed in said washer of substantially spherical contour; a peripheral flange on said tube; a spring embracing said tube and bearing at one end against said flange; a nut threadable upon the externally threaded portion of said body and engaging the opposite end of said spring and adapted upon being threaded on to said body for increasing the tension of said spring and increasing the pressure of the face of said tube against the face of said washer.

4. A joint of the class described, comprising a body having a bore formed therethrough and externally threaded at its opposite ends, said bore being internally threaded adjacent one end of said body, said bore having a tapered portion positioned inwardly from the ends of said internal threads; a seat-forming washer inserted in the tapered portion of said bore; a presser member threadable into said body at the internally threaded portion for engaging said washer and pressing the same into said tapered portion; a conducting tube projected into said body from the opposite end and having its inner end formed with a seat-forming face engageable with a recess formed in the opposed face of said seat-forming washer; a nut threaded on the opposite end of said body; a spring engageable with a portion of said tube having the seat-forming face and engageable with said nut for normally urging said face of said tube into engagement with the face of said washer to provide a leakproof engagement.

5. A joint of the class described, comprising a body having a bore formed therethrough, said bore being threaded adjacent one end of said body and having a tapered portion adjacent the inner end of the threaded portion; a fiber washer having a tapered periphery inserted into said bore and engageable in the tapered portion; a presser member threaded into the threaded portion of said bore and engageable with said washer for forcing the same into the tapered portion of said bore; a conducting tube inserted into the opposite end of said body and having its inner end formed with a face of substantially spherical contour engageable with a recess of substantially spherical contour formed in the opposed face of said washer; a spring engageable at one end with a portion of said tube, normally urging the end of said tube into engagement with the recess of said washer;

and a nut threaded on said body engageable with said spring and adapted upon threading on to said body for increasing the tension thereof.

6. A joint of the class described, comprising a tubular body having a bore formed therethrough, said bore being threaded adjacent one end and provided with a tapered portion proceeding inwardly from the inner end of the threads; a fiber washer positioned in said body and engageable in said tapered portion; a presser member threaded into the threaded portion of said bore and engageable at its inner end with said washer for forcing the same into the tapered portion, a tube insertable into said body from the opposite end and having a seat formed on its inner face engageable with a recess formed on the opposed face of the washer to provide a leakproof connection; an outward projection on said tube; a spring embracing said tube and engaging at one end with said projection; a nut threaded on said body and engageable with said spring and adapted upon threading on to and off of said body for adjusting the tension of said spring, said spring normally tending to maintain the face of said tube in engagement with the recess of said washer; and a set screw for locking said nut against rotation on said body.

7. A joint of the class described, comprising a tubular body having a bore formed therethrough, said bore being threaded adjacent one end and provided with a tapered portion proceeding inwardly from the inner end of the threads; a fiber washer positioned in said body and engageable in said tapered portion; a presser member threaded into the threaded portion of said bore and engageable at its inner end with said washer for forcing the same into the tapered portion; a tube insertable into said body from the opposite end and having a seat formed on its inner face engageable with a recess formed on the opposed face of the washer to provide a leakproof connection; an outward projection on said tube; a spring embracing said tube and engaging at one end with said projection; a nut threaded on said body and engageable with said spring and adapted upon threading on to and off of said body for adjusting the tension of said spring, said spring normally tending to maintain the face of said tube in engagement with the recess of said washer; and a set screw for locking said nut against rotation on said body; and a lock nut for locking said presser member against rotation relatively to said body.

JOSEPH BODNAR.

REFERENCES CITED

The following references are of record in the file of this patent:

UNITED STATES PATENTS

| Number | Name | Date |
|---|---|---|
| 1,042,852 | Von Boden | Oct. 29, 1912 |
| 1,795,541 | Brownell | Nov. 10, 1931 |